United States Patent
Hung et al.

(10) Patent No.: US 12,546,585 B2
(45) Date of Patent: Feb. 10, 2026

(54) DEPTH MAP CONSTRUCTION BY CAMERA PHASE DETECTION AND LENS CALIBRATION

(71) Applicant: Advanced Micro Devices, Inc., Santa Clara, CA (US)

(72) Inventors: Wei-Chih Hung, Hsinchu (TW); Po-Min Wang, Hsinchu (TW); Yu-Huai Chen, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 896 days.

(21) Appl. No.: 17/855,108

(22) Filed: Jun. 30, 2022

(65) Prior Publication Data
US 2024/0003680 A1    Jan. 4, 2024

(51) Int. Cl.
*G01B 11/22* (2006.01)

(52) U.S. Cl.
CPC .................... *G01B 11/22* (2013.01)

(58) Field of Classification Search
CPC ....................................... G01B 11/22
See application file for complete search history.

(56) References Cited

U.S. PATENT DOCUMENTS

2016/0125611 A1* 5/2016 Komatsu .......... G06V 10/803
348/135

OTHER PUBLICATIONS

Butler, R., "Exclusive: Fujifilm's Phase Detection System Explained", downloaded from https://www.dpreview.com/articles/2151234617/fujifilmpd, retrieved Jun. 29, 2022, Published Aug. 5, 2010, 3 pgs.

* cited by examiner

*Primary Examiner* — Minh Q Phan
(74) *Attorney, Agent, or Firm* — Volpe Koenig

(57) ABSTRACT

Techniques for generating a depth map are described. The techniques include obtaining a set of phase difference measurements with a phase detect sensor, and generating a depth map based on the set of phase difference measurements, utilizing a first set of calibration data correlating phase difference measurements with lens defocus data and a second set of calibration data correlating lens positions with object distances.

20 Claims, 6 Drawing Sheets

DEPTH MAP CONSTRUCTION BY CAMERA PHASE DETECTION AND LENS CALIBRATION

BACKGROUND

Cameras include phase detect sensors for various purposes such as autofocus. Improvements utilizing such techniques are frequently made.

BRIEF DESCRIPTION OF THE DRAWING

A more detailed understanding may be had from the following description, given by way of example in conjunction with the accompanying drawings wherein.

DETAILED DESCRIPTION

Techniques for generating a depth map are described. The techniques include obtaining a set of phase difference measurements with a phase detect sensor, and generating a depth map based on the set of phase difference measurements, utilizing a first set of calibration data correlating phase difference measurements with lens defocus data and a second set of calibration data correlating lens positions with object distances.

Figure 1:
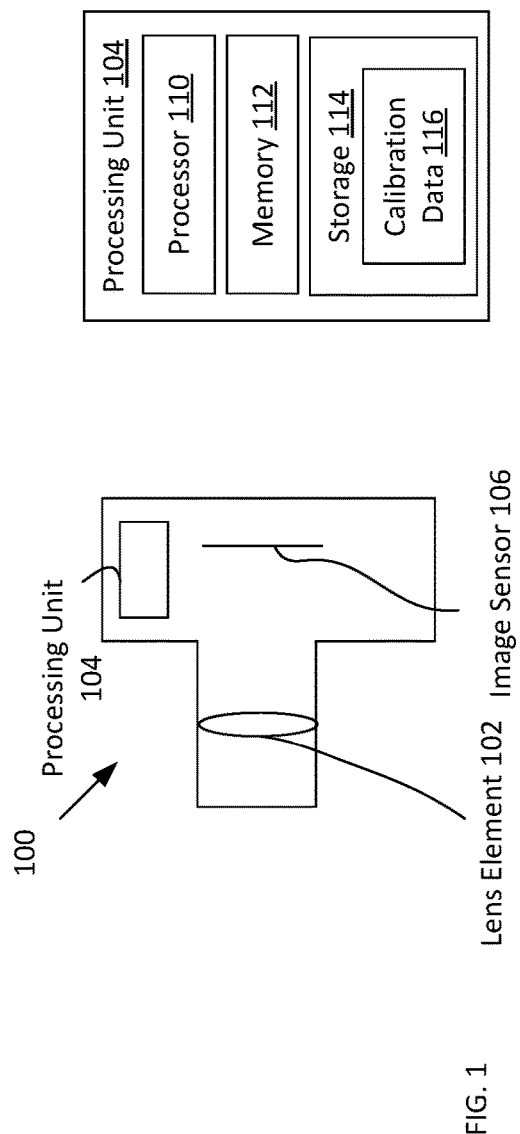
FIG. 1 illustrates a camera, according to an example.

FIG. 1 illustrates a camera 100, according to an example. The camera 100 is an example of a device that implements the techniques described herein. However, performance of the techniques described herein by any technically feasible device capable of performing such techniques is possible. In some examples, the camera 100 is included in another device such as a phone, a laptop or desktop computers, or any other device. In addition, although the camera 100 is depicted as having a particular shape, this shape is used for simplicity of explanation and is not intended to be limiting.

The camera 100 includes a lens element 102, a processing unit 104, and an image sensor 106. The lens element 102 is part of a lens system and can be adjusted to adjust focus. For simplicity, the entirety of the lens system is not shown, and the lens element 102 is representative of a wide variety of lens types capable of focusing. The image sensor 106 includes sensor elements such as photosensitive sites and a color filter to capture light that travels through the lens element 102. The processing unit 104 includes circuitry that is configured to control the camera 100 (for example, performing auto-focusing for the lens element 102, controlling the camera, including the lens element 102 and image sensor 106, to capture images, and other operations), and to receive image data with the image sensor 106.

The processing unit 104 includes a processor 110, a memory 112, and a storage 114. The memory 112 includes volatile memory elements that are configured to store working data and instructions for the processor 110. The storage 114 includes non-volatile memory elements that are configured to store data in a non-volatile manner. This data includes calibration data 116 that is used to correlate phase information for images received with the image sensor 106 to distance data, as described in further detail herein. The camera 100, including the processing unit 104, can include elements not illustrated in FIG. 1 or described herein.

Figure 2:
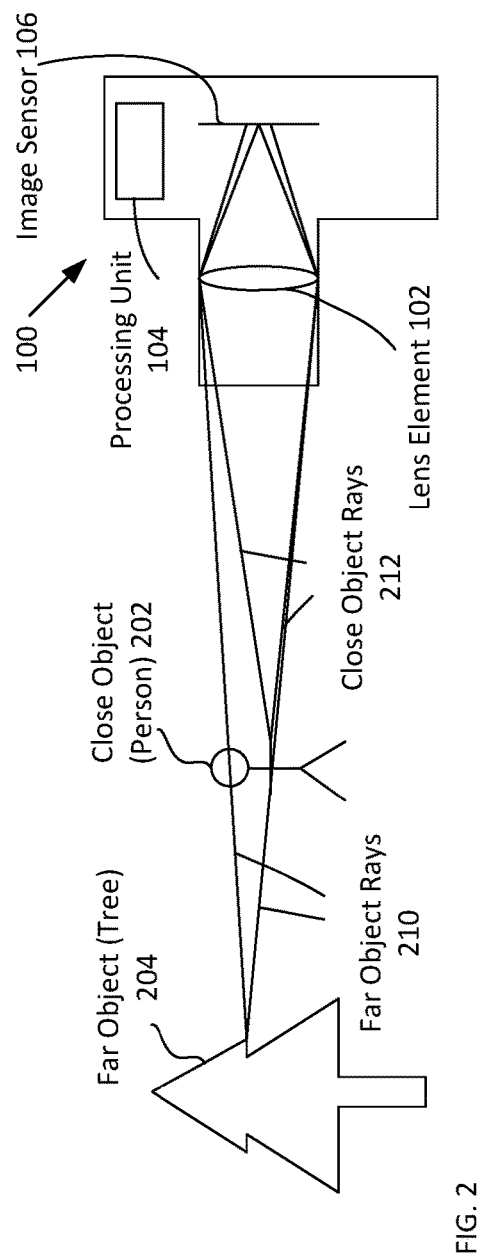
FIG. 2 is a diagram that illustrates a camera in operation, according to an example.

FIG. 2 is a diagram that illustrates the camera 100 in operation, according to an example. The camera 100 is pointed at a far object 204 (a tree in the example shown) and a close object 202 (a person in the example shown). The position of the lens element 102 controls which object is in focus. A lens bends light rays emitted or reflected from an object such that rays from the same point on the object fall on approximately the same location on the image sensor 106 (light rays in focus converge to within a threshold distance from each other). In general, lenses are unable to focus light rays from objects at all distances, and are adjusted to focus at different focal distances. While such adjustment varies by lens configuration, in general, focusing involves changing the position of one or more elements of the lens. In FIG. 2, the lens element 102 is in a position that causes the close object 202 to be in focus, but the far object 204 is not in focus. As can be seen, the close object rays 212 converge to a point on the image sensor 106, but the far object rays 210 do not converge to a point on the image sensor 106. It can be seen that the rays from the same point on an object are incident on different portions of the lens element 102. Again, a goal of a lens is to cause light rays from an object that are incident on a variety of locations of the lens itself to converge to a point.

Phase-detect autofocus is an autofocus technique whereby a camera automatically focuses on a particular object based on the phase difference associated with that object. The phase difference represents a difference in position of images obtained for different collections of light rays that pass through the lens. More specifically, a separating feature 302 is used to separate light rays captured through the lens element 102 so that only light rays from a portion of the lens element 102 are captured by a phase detect sensor. With separating features 302 positioned in different locations, different sets of light rays are captured. Light rays incident on a particular side of the lens element 102 are biased in a certain direction unless the object is in focus, which case all light rays converge. Thus, by blocking light rays from one side to form a first image, blocking light rays from another side to form a second image, and then comparing the first and second image, it can be determined whether features of an image are in focus. Specifically, if there is a positional difference between the first image and the second image, then the features are not in focus, and if there is minimal positional difference (e.g., difference below a threshold), then the features are considered to be in focus.

Figure 3:
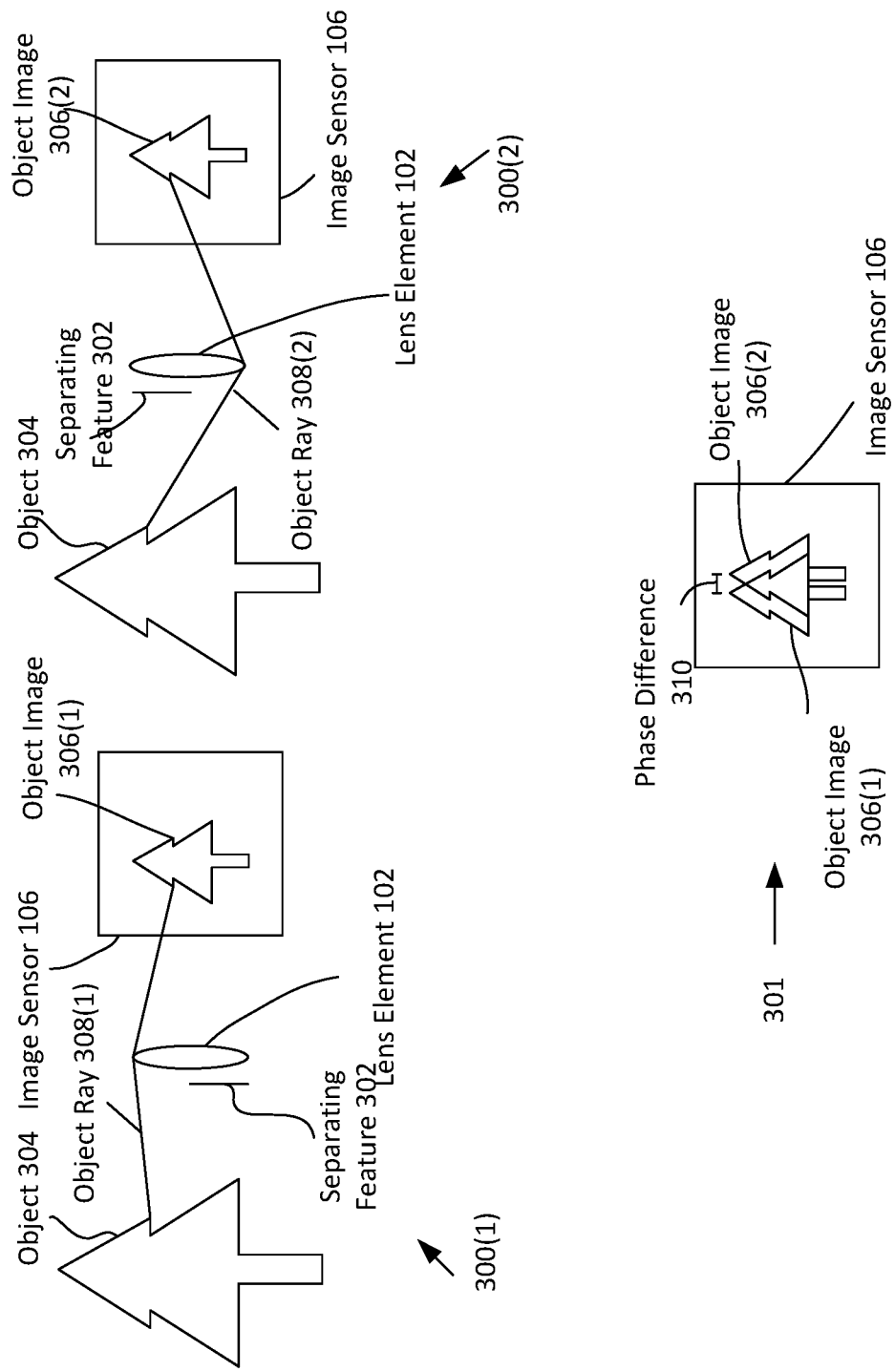
FIG. 3 is an illustration of a phase detect operation.

In the example of FIG. 3, a first imaging configuration 300(1) illustrates a separating feature 302 in a first position (e.g., on the bottom). In this configuration, the object ray 308(1) generates a first object image 306(1) at a first position. Regarding the second image configuration 300(2), a separating feature 302 is in a second position (e.g., at the top). In this configuration, the object ray 308(2) generates a second object image 306(2). A combined image 301 illustrates a substantial phase difference 310 (e.g., a phase difference above a threshold) between the object image 306(1) and the object image 306(2). Thus, the object represented is not in focus. A minimal phase difference 310 (e.g., a phase difference below a threshold) would indicate the object being in focus.

Some aspects of FIG. 3 are simplified for explanation. For example, it should be understood that a small number of light rays are illustrated for ease of illustration, but a lens focuses a very large number of light rays incident on a wide area of the lens. Also, although only a single object is shown in the various object images 306, an image captured by an image sensor 106 can include many objects. In addition, because objects can be at different distances from the camera, different objects may exhibit different phase differences 310. In various examples, the camera 100 includes multiple phase detect sites (e.g., on the image sensor 106 or not on the image sensor 106), each of which is configured to receive a portion of light rays as reduced by a separating feature. In some such examples, the camera 100 measures phase difference by comparing images formed from different sets of phase detect sites, where each set includes phase detect sites having separating features 302 blocking light rays from the same direction. In an example, the camera 100 generates a first image from a first set of phase detect sites having separating features 302 that block light rays from a first direction and generates a second image from a second set of phase detect sites having separating features 302 that block light rays from a second direction. In some places in this document, these images are called "phase-biased images." The camera 100 compares the offset (i.e., difference in position) for the first image and the second image to determine the phase difference 310 for that image. In some examples, the camera 100 performs such operations for multiple subdivisions of the image sensor 106, to determine phase difference for different portions of the image sensor 106. More specifically, the camera 100 groups together phase detect sites in the same area of the image sensor 106 (e.g., a square or rectangular "tile") and forms phase-biased images from such groups. This allows the camera 100 to have different phase detect measurements at different parts of the image sensor 106 and thus to determine focus for different parts of the image. In some examples, the separating features are optical barriers that prevent a portion of light rays incident on one side of a lens element 102 from arriving at a phase detect site. In some examples, these optical barriers are adjacent to the phase detect sites. In such examples, the optical barriers are in a physical location that blocks light rays coming from a particular direction. In other examples, the separating features are not optical barriers but are other elements that perform the described operations.

As stated above, the camera 100 obtains phase difference measurements 310 for different parts of an image. Techniques are provided herein to generate a depth map based on the phase difference measurements for an image. The depth map is a collection of distances from the camera for a variety of points in the image.

In general, the technique proceeds in the following manner. The camera 100 obtains phase difference measurements at multiple phase detection sites. Each phase detection site is an optical receptor that receives phase-related measurements and corresponds to a different site in an image captured by an image sensor 106. In some examples, the phase difference for different pairs of sites indicates how in focus the image is at that site. In such examples, each pair of sites is located close together and thus corresponds to a particular location on the image sensor 106 and the image captured. Also in such examples, each pair of sites includes a first phase detect site with a separating feature blocking light rays from a first direction and a second phase detect site with a separating feature blocking light rays from a second direction. Thus each pair captures different sets of light rays, each of which is phase-biased in a different manner. The phase difference associated with such a pair of sites is associated with a location on the sensor 106 and a captured image. The location is termed a "phase difference location." The measurement or phase difference value is sometimes termed a "phase difference measurement." Each phase difference measurement is associated with a phase difference location.

The camera 100 uses pre-stored phase difference-to-lens defocus calibration information to obtain lens defocus information for each phase difference location, based on the phase differences. Lens defocus represents a difference in lens position between an out-of-focus position and an in-focus position. In other words, the lens defocus indicates the degree to which the lens position must be adjusted for a given image object to become in focus. The lens position is the position of one or more lens elements of the lens that is adjusted to control focus of the lens. In general, lens positions are associated with axial displacements of lens elements, and differing axial displacements correspond to different degrees of focus. Many lenses have a range of lens positions, each of which is associated with a focusing distance. The focusing distance is the distance from the camera at which an object is considered to be in focus.

Based on the lens defocus and the actual lens position when the image was taken, the camera 100 generates the in-focus lens positions for each of the phase difference measurements. More specifically, the camera 100 knows the actual lens position when an image was taken and knows the lens defocus for each phase difference measurement. By applying the lens defocus to the actual lens positions, the camera 100 is able to obtain an appropriate lens position for each phase difference location. Based on pre-stored lens position-to-distance calibration information, the camera 100 obtains the distance corresponding to each phase difference location. More specifically, because the camera 100 knows the focus distance associated with each lens position, the camera 100 is able to obtain the actual distance of an object corresponding to the image at each phase difference location. Although it is sometimes described herein that the phase difference locations are associated with a pair of phase detect sensors, it is possible for a single phase detect sensor or more than two phase detect sensors to generate a phase difference measurement.

Figure 4:
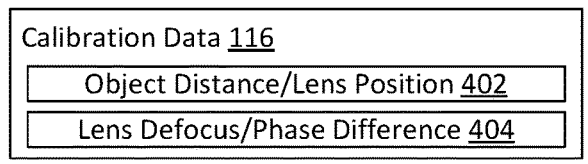
FIG. 4 illustrates the calibration data of the camera, according to an example.

FIG. 4 illustrates the calibration data 116 of the camera 100, according to an example. The camera 100 stores the calibration data 116, which can be obtained in any technically feasible manner. In some examples, a manufacturing facility generates or obtains the calibration data through testing or some other method and stores the calibration data into the storage 114 of the camera. In some examples, a party other than the camera manufacturer stores the calibration data into the storage 114 of the camera 100.

The calibration data 116 includes object distance/lens position data 402 and lens defocus/phase difference 404 data. The object distance/lens position data 402 indicates correlations between object distances when in focus and the position of the lens element 102 (or multiple lens elements, or other positional configuration that indicates the focus setting for the lens) to achieve that focus. The lens defocus/phase difference information 404 indicates the amount of lens defocus for different phase differences. Again, lens defocus is the difference in lens position between an in-focus and out-of-focus position. As phase difference increases, the lens defocus increases as well, since phase difference indicates the degree to which an image is out of focus. The lens defocus/phase difference calibration data 404 thus indicates, for each of a variety of phase difference values, the lens defocus amount. This information thus allows the camera 100 to determine a lens defocus amount based on the phase difference. Together, the calibration data 116 allows the camera 100 to determine the distance of an object based on the phase difference detected for that object.

In this disclosure, it is sometimes stated that the camera 100 performs an action. This should be interpreted as an element such as the processing unit 104, other circuitry, or one or more other elements of the camera 100 performing the action.

Figure 5:
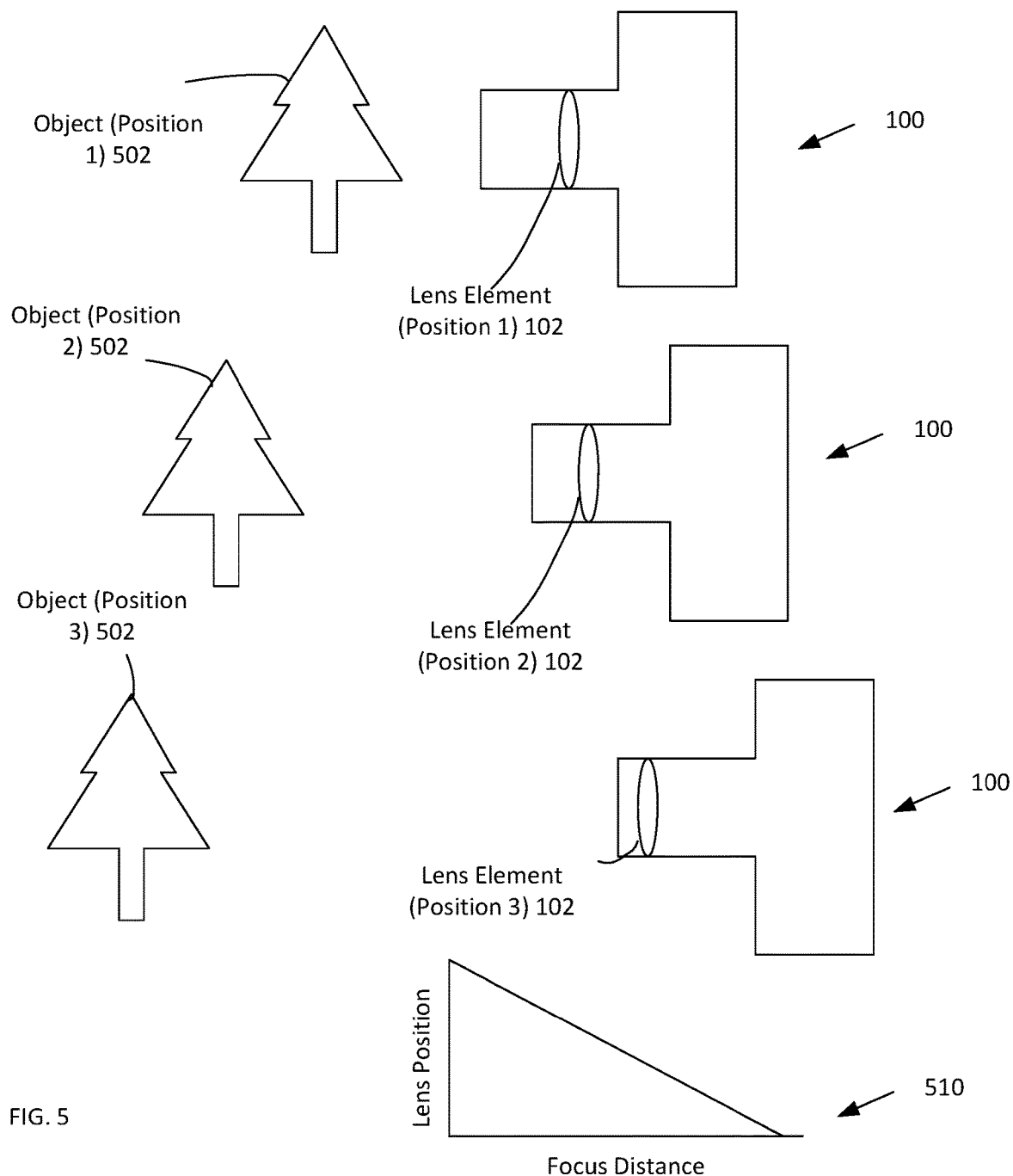
FIG. 5 shows an example that illustrates the object distance/lens position calibration data of FIG. 4.

FIG. 5 shows an example that illustrates the object distance/lens position calibration data 402 of FIG. 4. When the object 502 has a first position (position 1) and the lens element 102 is in a first position (position 1), the object 502 is in focus. When the object 502 has a second position (position 2), and the lens element 102 is in a second position (position 2), the object 502 is in focus. When the object 503 has a third position (position 3), and the lens element 102 is in a third position (position 3), the object 502 is in focus. If the lens element 102 is not in the illustrated positions, the object 502 may be out of focus.

Graph 510 illustrates lens position versus focus distance. It can be seen that as the lens position varies, the focus distance (distance at which objects are in focus) varies as well. Information represented in the graph 510 is stored as the object distance/lens position data 402.

Figure 6:
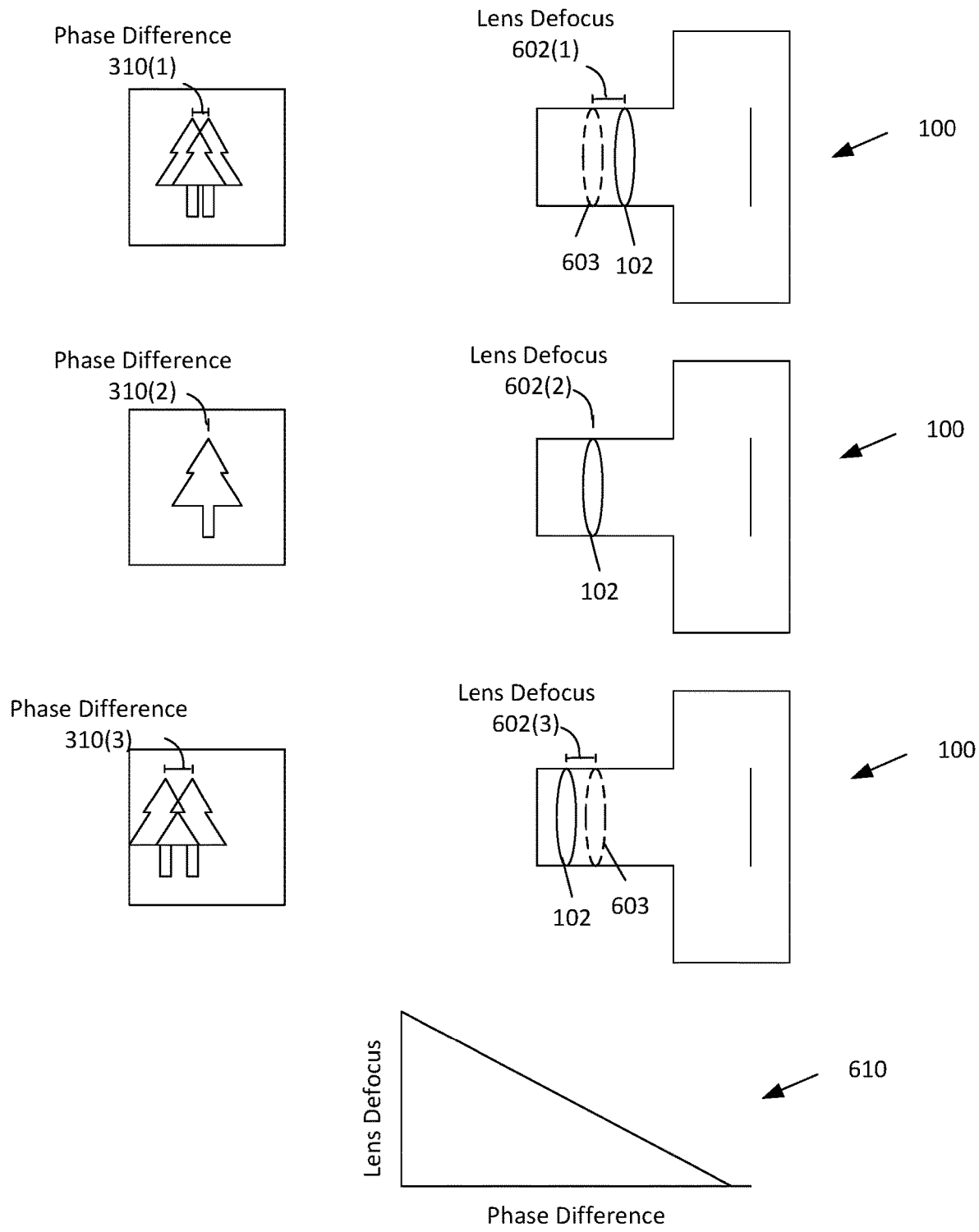
FIG. 6 shows an example that illustrates the lens defocus/phase difference calibration data of FIG. 4.

FIG. 6 shows an example that illustrates the lens defocus/phase difference data 404 of FIG. 4. For an object at a given distance from the camera, the measured phase difference 310 is correlated to the lens defocus 602. With a first phase difference 310(1), a first lens defocus amount 602(1) occurs. The lens element 102 is offset from the in-focus position 603 by a first lens defocus amount 602(1), meaning that the lens is not in the proper position to achieve focus of the object. The first lens defocus amount 602(1) is associated with a first phase difference 310(1).

For a second phase difference 310(2) of substantially zero (i.e., having an absolute value below a threshold), the lens defocus 602(2) is substantially zero (i.e., the lens element 102 has a lens defocus amount 602(2) below a threshold value). For a third phase difference 310(3), the lens defocus 602(3) has a different value. As can be seen, the lens defocus correlates to the phase difference 310. A graph 610 represents information correlating lens defocus to phase difference as would be stored as the lens defocus/phase difference data 404 in the calibration data 116.

Figure 7:
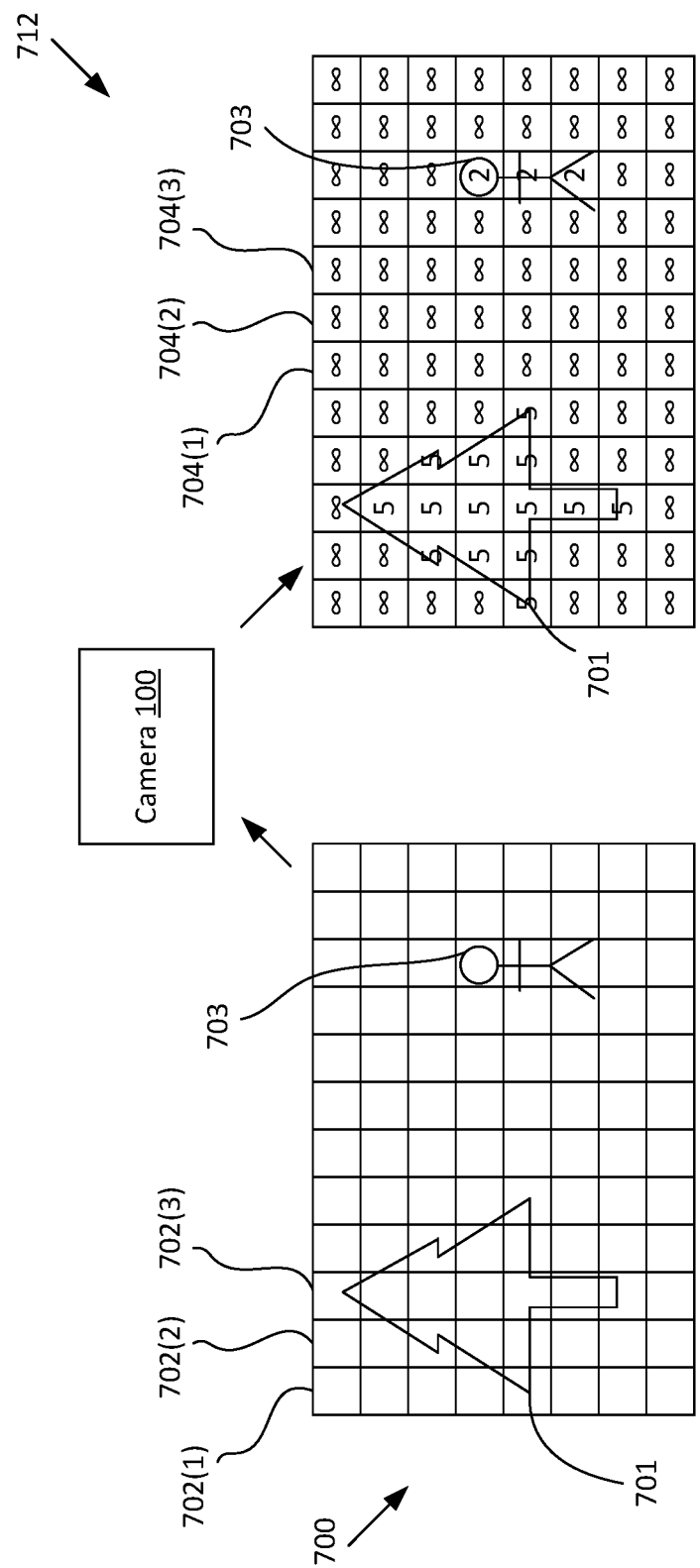
FIG. 7 illustrates operations for generating a depth map based on a phase difference image, according to an example.

FIG. 7 illustrates operations for generating a depth map 712 based on an image with phase detection data 700, according to an example. The camera 100 obtains an image, including phase information, for a scene. The image with phase detection data 700 includes a set of phase difference information for a variety of phase detect sites. The camera 100 obtains this image by measuring, at the various sites, phase differences for a captured image. The image with phase detection data 700 illustrates a first object 701 and a second object 703.

Figure 8:
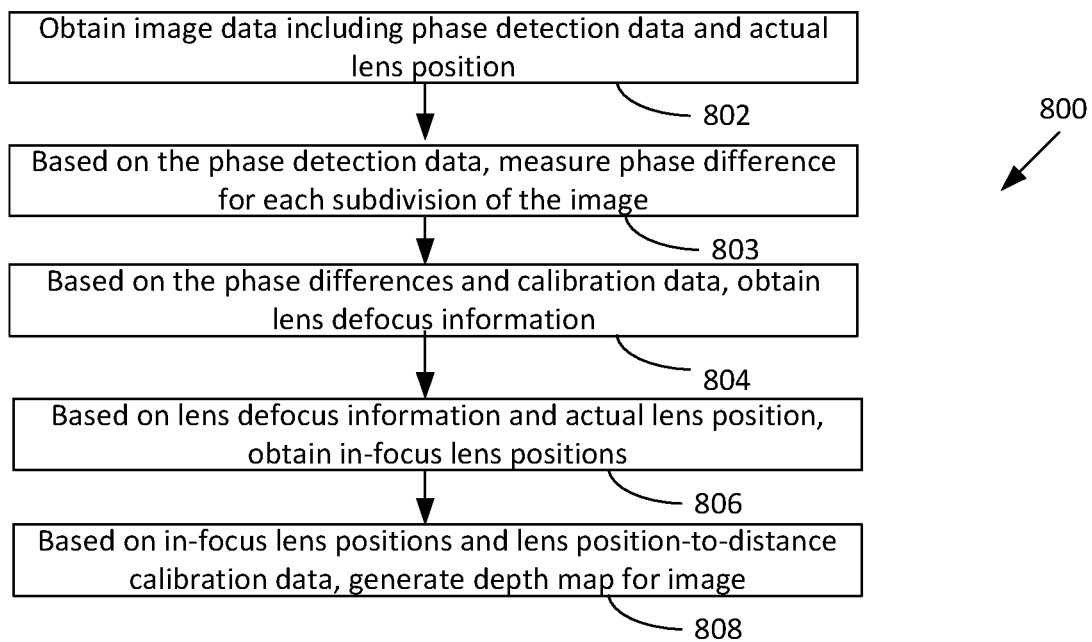
FIG. 8 is a flow diagram of a method for generating a depth map based on phase difference information, according to an example.

The camera 100 (e.g., the processing unit 104) generates a depth map 712 based on the image with phase detection data 700. FIGS. 7 and 8 will now be discussed together. FIG. 8 is a flow diagram of a method 800 for generating a depth map based on phase difference information, according to an example. Although described with respect to the camera 100 of FIG. 1, those of skill in the art will understand that any system configured to perform the operations of the method 800 in any technically feasible order falls within the scope of the present disclosure.

At step 802, the camera 100 obtains image data including phase detection data and an actual lens position. In an example, the camera 100 configures a lens to a particular lens position and activates a shutter to obtain an image as well as an image with phase detection data 700 (e.g., using phase detect sites). The camera 100 thus has information of the actual lens position as well as the image with phase detection data 700. At step 802, the camera 100 measures phase difference for each subdivision of the image, based on the phase detection data. In FIG. 7, the image with phase detection data 700 includes a plurality of phase difference data items, each at a different location in the image. Each phase difference data item indicates a phase difference for a corresponding location. Note that the location of an item of the phase difference data corresponds to a particular part of a visual image (e.g., an image including a plurality of pixels) taken with the camera 100.

At step 804, the camera 100 obtains lens defocus information based on the image with phase detection data 700 and the calibration data 116. Specifically, the calibration data 116 indicates correlations between phase differences and lens defocus. Using this data, the camera 100 is thus able to obtain lens defocus information for each of the phase difference measurements of the phase difference image 700. For example, for each phase difference measurement of the image with phase detection data 700, the camera 100 consults the calibration data 116 and obtains a corresponding item of lens defocus information.

At step 806, the camera obtains in-focus lens positions for each item of lens defocus information, based on the lens defocus information and actual lens position. The lens defocus information indicates the displacement of the lens position. Thus, by combining (e.g., adding) the actual lens position with the lens defocus information, the camera 100 obtains in-focus lens positions for each item of phase difference information of the phase difference image 700.

At step 808, the camera 100 obtains the depth map 712 based on the in-focus lens positions and the lens position-to-distance calibration data 402. More specifically, because each lens position corresponds to an object distance (i.e., the lens has an in-focus position for each object distance, where the in-focus position is the position of the lens at which the object is in focus), the camera 100 is able to obtain a distance for each item of in-focus lens positions. The camera 100 thus generates the depth map 712, which includes distance information for each of the items of phase difference information of the image with phase detection data 700.

The processing unit 104 represents hardware circuitry configured to perform the operations described herein. The processor 110 is a programmable processor, a fixed-function processor, or a combination thereof. The lens element 102 is an optical element having a shape and composition configured to focus light rays onto the image sensor 106. The image sensor 106 is a combination of hardware circuitry, optical elements, and other elements that capture light and provide captured images to the processor 110. The hardware circuitry includes digital, analogue, and/or a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device, comprising:
   a phase detect sensor; and
   a processing unit configured to:
      obtain a set of phase difference measurements with the phase detect sensor, and
      generate a depth map based on the set of phase difference measurements, utilizing a first set of calibration data correlating phase difference measurements with lens defocus data and a second set of calibration data correlating lens positions with object distances.

2. The processing device of claim 1, wherein:
   the set of phase difference measurements includes a phase difference measurement for each of a set of phase detect sites.

3. The processing device of claim 2, wherein the phase difference measurement corresponds to a displacement between a first image taken with a first separating feature and a second image taken with a second separating feature.

4. The processing device of claim 1, wherein generating the depth map comprises: determining, based on the set of phase difference measurements and the first set of calibration data, a set of lens defocus data.

5. The processing device of claim 4, wherein generating the depth map further comprises:
   determining, based on the set of lens defocus data and an actual lens position, a set of in-focus lens positions.

6. The processing device of claim 5, wherein generating the depth map further comprises:
   determining, based on the set of in-focus lens positions and the second set of calibration data, distance data that comprises the depth map.

7. The processing device of claim 1, wherein the depth map includes an object distance corresponding to each of a set of phase detect sites.

8. The processing device of claim 1, wherein obtaining the set of phase difference measurements includes capturing an image.

9. The processing device of claim 1, wherein the phase detect sensor is integrated within an image sensor.

10. A method, comprising: obtaining a set of phase difference measurements with a phase detect sensor, and generate a depth map based on the set of phase difference measurements, utilizing a first set of calibration data correlating phase difference measurements with lens defocus data and a second set of calibration data correlating lens positions with object distances.

11. The method of claim 10, wherein:
    the set of phase difference measurements includes a phase difference measurement for each of a set of phase detect sites.

12. The method of claim 11, wherein the phase difference measurement corresponds to a displacement between a first image taken with a first separating feature and a second image taken with a second separating feature.

13. The method of claim 10, wherein generating the depth map comprises:
    determining, based on the set of phase difference measurements, and the first set of calibration data, a set of lens defocus data.

14. The method of claim 13, wherein generating the depth map further comprises:
    determining, based on the set of lens defocus data and an actual lens position, a set of in-focus lens positions.

15. The method of claim 14, wherein generating the depth map further comprises:
    determining, based on the set of in-focus lens positions and the second set of calibration data, distance data that comprises the depth map.

16. The method of claim 10, wherein the depth map includes an object distance corresponding to each of a set of phase detect sites.

17. The method of claim 10, wherein obtaining the set of phase difference measurements includes capturing an image.

18. The method of claim 10, wherein the phase detect sensor is integrated within an image sensor.

19. A non-transitory computer-readable medium storing instructions that, when executed by a processor, cause the processor to perform operations comprising: obtaining a set of phase difference measurements with a phase detect sensor, and generate a depth map based on the set of phase difference measurements, utilizing a first set of calibration data correlating phase difference measurements with lens defocus data and a second set of calibration data correlating lens positions with object distances.

20. The non-transitory computer-readable medium of claim 19, wherein:
    the set of phase difference measurements includes a phase difference measurement for each of a set of phase detect sites.

* * * * *